United States Patent [19]

Schneider

[11] 3,720,926

[45] March 13, 1973

[54] INFORMATION STORAGE USING $M_A$ COLOR CENTERS IN ALKALI FLUORIDES

[76] Inventor: Irwin Schneider, 2402 Daphne Lane, Alexandria, Va. 22306

[22] Filed: March 31, 1971

[21] Appl. No.: 129,709

[52] U.S. Cl...........................340/173 CC, 350/160 R

[51] Int. Cl. .......G11c 11/34, G11c 13/04, G02f 1/36

[58] Field of Search..............350/160 R; 340/173 CC

[56] References Cited

UNITED STATES PATENTS 3,466,616 9/1969 Bron et al.......................340/173 CC

OTHER PUBLICATIONS

Publication I, Color Centers in Solids, by Schulman & Compton, MacMillan, New York, pp. 115–138.

*Primary Examiner*—Bernard Konick
*Assistant Examiner*—Stuart Hecker
*Attorney*—R. S. Sciascia, Arthur L. Branning and Kenneth J. Hovet

[57] ABSTRACT

Anisotropic color centers, such as M and $M_A$ centers in alkali fluoride crystals such as sodium fluoride (NaF), are used for the storage of information. Polarized optical irradiation is used to align the color centers along discrete crystallographic directions. Reorientation of a center can occur whenever the incident irradiation is of proper wavelength and is absorbed by the center. An information state is related to the particular orientation of the color centers and is subsequently read-out by detecting and interpreting the degree of absorption of incident polarized optical radiation thereon or its induced polarized emission. Unlike other materials for which this technique is applied, the operational temperature of the NaF is much higher (above 200°K) than has ever previously been required.

17 Claims, 2 Drawing Figures

INVENTOR
IRWIN SCHNEIDER

Ken J. Hovet AGENT

Arthur L. Branning ATTORNEY

PATENTED MAR 13 1973 3,720,926

SHEET 2 OF 2

INVENTOR
IRWIN SCHNEIDER

Ken J. Hovet
AGENT

ATTORNEY

INFORMATION STORAGE USING $M_A$ COLOR CENTERS IN ALKALIFLUORIDES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an information storage system in which information states are established in photochromic materials by electromagnetic radiation. More particularly, this invention concerns the orientation of dichroic defects within a crystal such as sodium fluoride maintained at room temperature, or below, for the purpose of effecting a memory therein.

DESCRIPTION OF THE PRIOR ART

Development of photochromic information storage systems with rapid write-read-erase capability requires a storage medium which exhibits negligible fatigue and thermal fade and which has a nondestructive readout. Unfortunately, most media have not met these requirements. For example, AgCl crystallites in glass show thermal fading, organic materials exhibit fatigue, and systems based on the interconversion of color centers in alkali halides show both fatigue and/or destructive readout. The technique employing anisotropic defects in alkali halides such as KCl, KBr, KI etc., as described in U.S. Pat. No. 3,466,616 and U.S. Patent application Ser. No. 708,299, filed Feb. 26, 1968, now U.S. Pat. No. 3,580,688, overcome many of these difficulties but require operating temperatures no greater than roughly 200°K. This is a practical disadvantage as it requires continuous refrigeration during operation. This not only leads to an additional cost in equipment, maintenance, etc., but introduces the possibility of information destruction during power failure

SUMMARY OF THE INVENTION

In accordance with the present invention, novel optical information storage memory elements operable at room temperature are provided comprising alkali fluoride crystals containing M or $M_A$ centers. These materials are utilized as optical memory elements in conjunction with known prior art information storage systems. The unique feature of these materials are that they have a relatively fatigue-free, high storage density capability at temperatures above 200°K including room temperature.

OBJECTS OF THE INVENTION

It is, therefore, an object of the present invention to provide a novel information storage system which can be operated at temperatures above 200°K — including room temperature.

It is a further object of the present invention to provide an information storage system which utilizes the unique anisotropic properties of dichroic defects dispersed within an alkali fluoride crystal for effecting information storage and retrieval.

It is another object of the present invention to provide an information storage system which relates to the orientation of color centers within a memory element to information states.

It is a still further object of the present invention to provide an alkali fluoride memory element which exhibits rapid write-read-erase capability with little fatigue at room temperature or below.

Still other objects, features and attendant advantages of the present invention will become apparent to those skilled in the art from a reading of the following detailed description taken in conjunction with the accompanying drawings wherein:

DESCRIPTION OF THE PREFERRED EMBODIMENT

In general, the present invention provides a unique memory element for use in optical information storage and retrieval systems. Memory element materials suitable for use with the present invention are alkali fluorides such as lithium fluoride and sodium fluoride. A particularly useful memory element comprises a sodium fluoride crystal having dichroic defects which can be selectively aligned along distinct crystal lattice directions. Information states are related to a particular orientation of the dichroic defects such that there exists selective absorption of optical radiation incident thereon which can readily be detected by absorption or emission measurements and become translated into the information states.

The dichroic defects especially suitable for use with NaF crystals are known as M and $M_A$ centers. These may exist in concentrations of $5 \times 10^{18}$ per $cm^3$ of crystal or less. The M and $M_A$ centers with the apparatus in which they are used along with the proper techniques are disclosed in U.S. Pat. No. 3,466,616 and U.S. Patent application Ser. No. 708,299, filed Feb. 26, 1968 now U.S. Pat. No. 3,580,688, respectively, which are hereby incorporated by reference.

Figure 1:
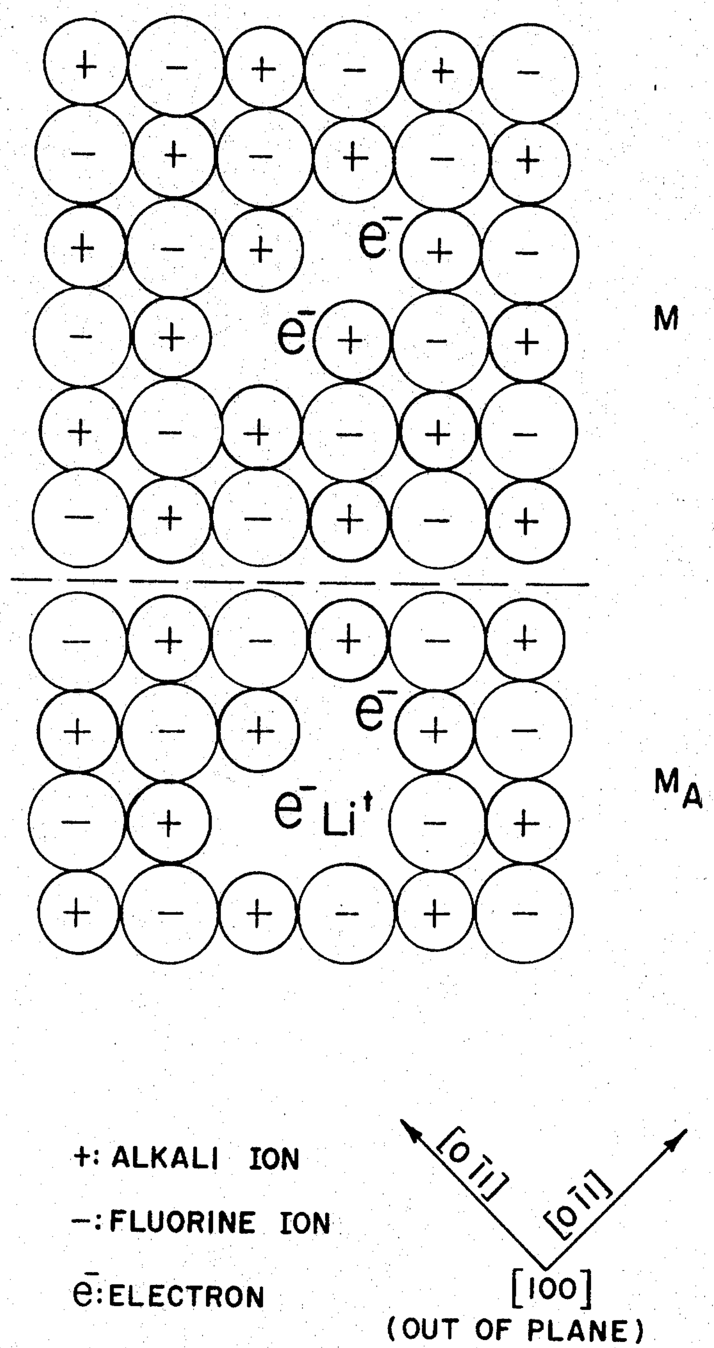
FIG. 1 is a schematic representation of an M and an $M_A$ center consisting, respectively, of two electrons trapped at a negative-ion vacancy pair, and an M center lying next to an $Li^+$ impurity ion.

Briefly, an M center is a pair of nearest-neighbor F centers which has two distinct, well-separated absorptions usually called the M and $M_F$ bands. Of importance is the fact that a distinct dipole moment is associated with each M-center absorption. In particular, for a center oriented along [011], as shown in FIG. 1, the [011] moment contributes to the M band and both the [100] and $[0\bar{1}1]$ moments contribute to the $M_F$ band. M centers can be induced to reorient with $M_F$ light so long as the electric vector of the incident light has a component parallel to the dipole moment of the $M_F$ absorption. As a result, one can realign practically all M centers along one direction with linearly polarized light and thereby make the M and $M_F$ absorption bands strongly dependent on the polarization of the incident light, i.e., the absorption bands are made dichroic. As shown in FIG. 1, the $M_A$ center is an M center adjacent to a substitutional alkali-ion impurity and the above discussion likewise applies to $M_A$ centers.

Figure 2:
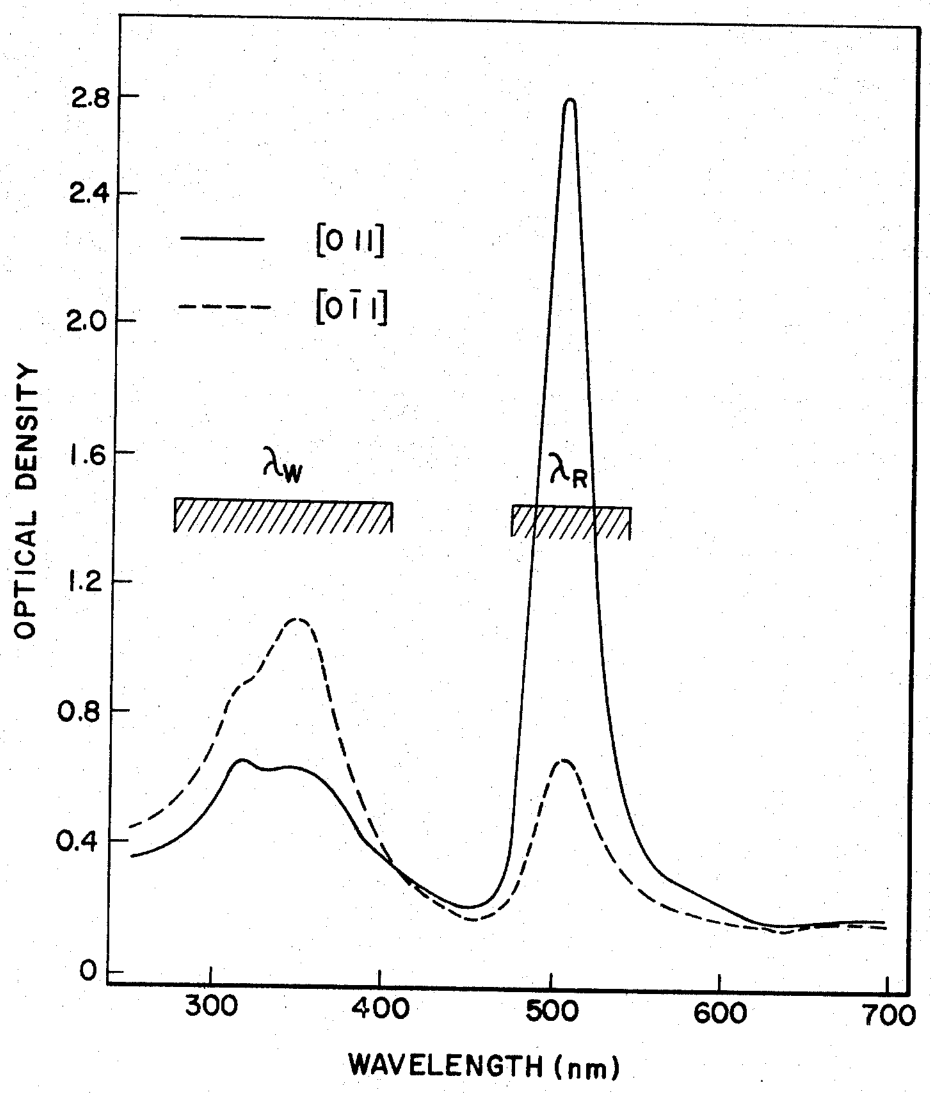
FIG. 2 is a graph showing absorption spectra of a typical NaF crystal both colored and measured at room temperature.

The basic idea for optical storage is that information is written or erased with polarized light in the $M_F$ band whose wavelengths are designated $\lambda_W$ in FIG. 2. The use of NaF as a memory device is illustrated in FIG. 2 wherein the absorption spectra of a NaF crystal measured at room temperature is plotted. Once the crystals have been colored, through the use of ionizing irradiation such as X rays, $\gamma$ rays, electron-bombardment, etc., and M centers have been produced therein through the use of F-band excitation, substantially all the M centers produced may be aligned along a single [011] direction, using [011] polarized $M_F$ light. Information may then be written-in by exposing predetermined portions of the crystal with uv light polarized at right angles to the light used for alignment, i.e., along the $[0\bar{1}1]$ direction. This $M_F$ writing wavelength region lies between 300–400 nm and is designated $\lambda_W$ in FIG. 2. M-center reorientations occur only in those portions of the crystal irradiated. However, such exposed portions may range from the entire crystal to those approaching the dimensions of the wavelength of the light used. By using microscopic sized portions comparable to the writing wavelength, the crystals of the present invention have a potential storage capacity in excess of $10^8$ bits per $cm^2$ and, in addition, are useful at temperatures of 200°K or above, including room temperature.

After the information is written-in as described above, it may be nondestructively read by exposing the information-containing portions of the crystal with M light designated as $\lambda_R$ in FIG. 2. The $\lambda_R$ wavelengths used lie roughly between 480–550 nm. Upon illumination with the $\lambda_R$ light the M centers not only absorb light but also emit radiation having a range of wavelengths centered at around 630 nm. This emission, through its polarization, contains the information written into the crystal. Alternatively, the information may be read by measuring the amount of polarized $\lambda_R$ light transmitted (i.e., the amount of light not absorbed) through the crystal. U.S. Patent application Ser. No. 708,299 describes the above process with the use of $M_A$ color centers which, as previously described, are also suitable for use with the present invention.

To erase the stored information, the color centers are simply re-exposed to $\lambda_W$ light of the original polarization. Using the M center as an illustration, this would involve using polarized uv light having wavelengths lying roughly between 300–400 nm. As to specific apparatus useful with the present invention, reference may be made to FIG. 4 and the accompanying description in U.S. Patent application Ser. No. 708,299.

To be a useful device, it would be desirable that the alkali fluoride memory elements be as fatigue-free near room temperature as possible. In other words, the M or $M_A$ centers should under continuous optical excitation be stable for as long as possible. In general, the stability of M or $M_A$ centers depends upon two independent factors. Since M or $M_A$ centers contain anion vacancies and since they have in effect been produced with ionizing irradiation (i.e., — X-rays etc.), they thereby form in conjunction with interstitials (interstitials are anion atoms or ions trapped between other ions in the crystal at nonlattice positions). Thus, the stability depends on one's ability to localize the interstitials. In addition, stability depends on one's ability to localize the M centers. The effectiveness in localizing interstitials evidently depends on the purity of the material and also on the specific impurities that have been added to the crystal during growth. For example, much greater stability can be achieved through the use of extremely pure NaF in which most of the oxygen-associated impurities have been removed. High purification evidently removes certain impurities which are only weakly effective in localizing interstitials. However, high stability is achieved by selectively doping this pure material, for example, with $Na_2O_2$. It would be anticipated that a wide range of other impurities might be equally effective, if not more so. The ability to localize M centers is achievable simply through the creation of $M_A$ centers. As an example, an M center next to an $Li^+$ ion in the NaF lattice would be one simple type of $M_A$ center. Clearly, high stability is achieved through the pinning of the M center at the $Li^+$ site. This pinning does not, however, adversely affect the rotational properties of the resulting $M_A$ center.

While NaF is a preferred crystal, another example of an alkali fluoride containing dichroic defects which may be used at room temperature is LiF. Here, the $\lambda_W$ wavelength regions would lie much further in the uv (around 250 nm). The $\lambda_R$ wavelength would be around 450 nm.

Variations of the present invention would involve incorporating the teachings of U.S. Patent Application Ser. No. 101400 filed Dec. 24, 1970 to the present invention. Since M (or $M_A$) centers reorient by first ionizing and then absorbing light, one could suppress the reorientation efficiency or writing speed by bleaching absorptions which form by capturing the M (or $M_A$) center electrons before the $M^+$ (or $M_A^+$) reorient. Conversely, the writing speed can be enhanced by incorporating into the sample electron capturing impurities, such as lead or thallium. This leads to greater $M^+$ (or $M_A^+$) absorptions which in turn results in higher reorientation efficiencies.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical information storage and retrieval system comprising:

an optical material having $M_A$ centers capable of being aligned in a common direction at temperatures above 200°K;

first irradiating means including polarized radiation operatively associated with said material to align substantially all said $M_a$ centers in a common direction;

second irradiation means including polarized radiation of different polarity from said first irradiating means operatively associated with said material to reorient said $M_A$ centers in predetermined portions of said optical material whereby information is written into said optical material; and detection means including third irradiating means operatively associated with said material for determining the information state thereof; wherein the improvement comprises alkali fluoride as said optical material.

2. The system of claim 1 wherein said alkali fluoride is sodium fluoride.

3. The system of claim 1 wherein said alkali fluoride is lithium fluoride.

4. An optical memory system utilizing the anisotropic properties of color centers within an alkali halide memory element for representing information states comprising:

a memory element comprising an alkali fluoride having $M_A$ centers dispersed therein which can be reoriented at temperatures above 200°K;

optical excitation means directed toward predetermined portions of said element including a first polarized irradiation means for orienting selected $M_A$ centers to represent stored information and for removing said information;

a second polarized irradiation means for interrogating said selected $M_A$ centers; and, detection means operatively associated with said memory element for determining the information state thereof.

5. The system of claim 4 wherein said alkali fluoride is sodium fluoride.

6. The system of claim 4 wherein said alkali fluoride is lithium fluoride.

7. An alkali fluoride memory element containing $M_A$ centers dispersed therein which are oriented at temperatures above 200°K along predetermined directions to represent stored information.

8. The memory element of claim 7 wherein said alkali fluoride is lithium fluoride.

9. The memory element of claim 7 wherein said alkali fluoride is sodium fluoride.

10. The sodium fluoride memory element of claim 9 which has been doped with $Na_2O_2$.

11. The sodium fluoride memory element of claim 9 which has been doped with LiF.

12. A method of storing and retrieving information at temperatures above 200°K including room temperature comprising the steps of:

establishing particular orientations of $M_A$ centers in at least portions of an alkali fluoride crystal with a first optical radiation at a temperature between 200°K and room temperature; and determining the orientation of said $M_A$ centers by irradiating said portions of said crystal with a second optical radiation and measuring the transmission therefrom.

13. The method of claim 12 wherein said alkali fluoride is sodium fluoride.

14. The method of claim 12 wherein said steps are carried out at room temperature.

15. The method of claim 12 wherein said alkali fluoride is lithium fluoride.

16. The method of claim 12 wherein said first and second radiations are linearly polarized.

17. The method of claim 16 wherein said first radiation has a wavelength between 300–400 nm and said second radiation has a wavelength between 480–550 nm.

* * * * *